United States Patent Office 3,671,289

Patented June 20, 1972

3,671,289

PRE-ETCH TREATMENT OF ACRYLONITRILE-BUTADIENE-STYRENE RESINS FOR ELECTROLESS PLATING

Eileen Maguire, San Gabriel, and Leon A. Kadison, Pasadena, Calif., assignors to Crown City Plating Co., El Monte, Calif.

No Drawing. Filed Sept. 23, 1969, Ser. No. 860,431

Int. Cl. B44d *1/092;* C23c *3/02*

U.S. Cl. 117—47 A 21 Claims

ABSTRACT OF THE DISCLOSURE

Solutions containing certain hydroxylated and etherified monoacetates are used to pre-etch ABS resins to improve the adhesion of metals in electroless plating processes.

BACKGROUND OF THE INVENTION

The present invention relates to electroless plating of acrylonitrile-butadiene-styrene resins (hereinafter called ABS resins), more particularly to improving the bond strength between an electrolessly deposited metal coating and the ABS resin substrate.

Recently, considerable demand has developed for metal plating on non-conductive articles, particularly plastic articles. In the finished product the desirable characteristics of the plastic and metal are combined to offer thereby the technical and aesthetic advantages of each. For instance, the low-weight, easily-formed, high-impact strength of articles fabricated from ABS resins may be aesthetically and mechanically enhanced by metal coating. Although ABS resins, like most plastics, are electrically non-conductive, a metal bond to the surface can be established by an initial plating operation, known as "electroless plating." This is typically accomplished by conditioning the surface for plating by etching with a strong oxidizing acid, seeding the surface by contact with a noble metal salt solution, e.g., a palladium chloride solution, then immersing the seeded surface in an autocatalytic electroless solution where an initial coating of a conductive metal, e.g., copper and nickel, is established by chemical deposition. The metal coating formed acts as a bus which allows a thicker metal coating to the built up electrolytically.

Adhesion between the metal plate and the ABS resin substrate is, however, dependent on the strength of the resin-metal bond. Adhesion has been fairly poor, ranging from only between about 5 to 12 lbs. per inch using the standard 90° peel test.

It has been proposed to improve adhesion by organically pre-etching the surface prior to etching with the strong acid. The system offered was ketone based and a very strong ABS solvent.

Organic pre-etching with this system did not, however, find acceptance for several reasons. Aesthetically the system had a detrimental effect on the final appearance of the article and was found not to improve the adhesion of electrolessly deposited nickel. It also tended to undermine the resin substrate and, although bond strength was improved, generally to about 13 to 15 lbs. per inch when the etchant was properly employed, failure often occurred within the body of the resin, as evidenced by an extensive removal of the plastic with the metal plate during the peel test.

SUMMARY OF THE INVENTION

It has now been found that the adhesion of electrolessly deposited metal coatings to an ABS resin substrate can be substantially improved without a detrimental effect on the appearance by preceding etching with a strong oxidizing acid with an organic etch using a solution containing an etchant selected from the group consisting of (1) at least one compound of the formula:

$$CH_3-\overset{\overset{O}{\|}}{C}-OR-O-R'$$

wherein R is an aliphatic hydrocarbon radical containing from 1 to about 4 carbon atoms and R′ is a radical selected from the group consisting of hydrogen, methyl, ethyl and the group, $C_2H_4—O—C_2H_5$, and (2) methyl acetoacetate, contained in a media substantially inert with respect to the ABS resin.

Where limited solubility in the media exists, etchants maintained at a concentration within 4% by volume of maximum saturation are preferably used. In addition, improvement in adhesion will be enhanced by terminating the etching effect by hydrolysis with an acid or base wash immediately after organic etching and before contact with the oxidizing acid. Pre-etching with compounds of the present invention have increased the total adhesion of the metal coating well over 20 lbs. per inch for both copper and, quite unexpectedly, nickel. Adhesion is further optimized by amploying as the strong oxidizing acid a solution containing chromic acid and trivalent chromium ions and by immersing the electrolessly plated substrate in a dilute aqueous nonionic or anionic surfactant solution prior to normal aging to prevent the drying out of absorbed salts and oxidation of the electrolessly deposited layer.

DESCRIPTION

According to the present invention, the bond strength of metals electrolessly deposited on an ABS resin substrate is remarkedly improved by preceding etching with a strong oxidizing acid with the organic pre-etch solution containing certain hydroxylated and etherified etchants.

The ABS resins, treated according to the practice of this invention, are generally articles molded or fabricated from plateable grades of resins obtained by the interpolymerization of acrylonitrile, butadiene and styrene (ABS).

The organic pre-etch solutions used for conditioning the ABS resin, in accordance with the practice of this invention, are solutions containing, as the predominant etchant, an etchant selected from the group consisting of (1) a compound of the formula:

$$H_3C-\overset{\overset{O}{\|}}{C}-OR-OR'$$

wherein R is an aliphatic hydrocarbon radical containing from 1 to about 4 carbon atoms and R′ is a radical selected from the group consisting of hydrogen, methyl, ethyl and the group, $C_2H_4—O—C_2H_5$, and (2) methyl acetoacetate, contained in a media substantially inert with respect to the ABS resin. The media used may vary widely and includes, among others, water, acetic acid, alcohols, glycols, glycol ethers and the like, as well as mixtures thereof. Water, for economic reasons, and since it is the chief fluid media found at plating operations, is preferred.

Illustrative, but no wise limiting, of the etchants used in accordance with the practice of this invention include, among others, glycol monoacetate, propylene glycol acetate, methyl Cellosolve™ acetate (2-methoxy-ethanol, acetate), Cellosolve™ acetate (2-ethoxyethanol, acetate), Carbitol™ acetate [2-(2-ethoxyethoxy) ethanol, acetate], methyl acetoacetate and the like.

While the media should be substantially inert to the ABS resin, it may be active inter se. It has been found that in a media such as water, optimum results will be obtained at etchant concentrations within about 4% of solution saturation.

The etchant, however, will tend to hydrolyze in the presence of water to form carboxyl and hydroxyl by-products. The reaction is reversible and normally close to the law of mass action. Temperature will increase reaction velocity but will not modify the effect on equilibrium. The acetic acid formed increases the solubility. To maintain optimum bond strength, therefore, generally requires further of the etchant to augment the effect of the formation of acetic acid.

The effect of the formation of a carboxylic acid can also be offset by the addition of alkalis, such as sodium hydroxide, potassium hydroxide or ammonium hydroxide. The acetate salts so formed thereby will generally reduce the solubility and the system will perform at optimum. Control may also be accomplished by adding a buffering agent, such as sodium acetate, to the system to keep the solution close to neutral. Preferably, the agent is added as the initial ingredient and from time to time as conditions require to maintain the solution close to neutral.

Although generally even the presence of low concentrations of etchant will have a positive effect on bond strength, optimum results are obtained at concentrations within about 4% of saturation under conditions of limited solubility. This offers operational latitude and a strong tolerance for lack of attention by workers.

When media other than water are used, and in which a higher degree of etchant solubility is available, it is preferred to have the etchant present in an amount only sufficient to cause a de-glazing and satinizing of the surface of the ABS resin substrate. While not bound by theory, this is believed to have the effect of initially increasing the porosity of the surface, thereby making the butadiene portion of the surface more susceptible to attack with the strong oxidizing acid. Generally, the amount required for this result, where the etchant is substantially or infinitely soluble in the carrier media, is generally less than about 40% by volume.

Surface active agents, such as non-ionic wetting agents, may advantageously be added to the pre-etching solutions of this invention to promote even etching.

It is contemplated within the ambit of this invention that there may also be present other materials in minor amounts which may serve as solvents for ABS resins. When present, however, they must not cause gelation of the surface, which has been found to be detrimental to the appearance of the finished article.

Since the action of the etchant is only to de-glaze and satinize the surface of the ABS resin substrate, the substrate may be safely immersed in the etchant for long periods of time. For practical reasons, however, residence times ranging from about ½ to about 3 minutes, preferably about 1 minute, are typically employed.

Solution temperature is not narrowly critical. However, elevated temperatures speed the conditioning process and temperatures from about 90° F. up to the softening point of the ABS resin, preferably from about 90° to about 130° F., and more preferably from about 100° to about 110° F., may be advantageously employed.

After conditioning the surface of the ABS resin with the etchant solution according to the practice of this invention, the article may then be simply rinsed and passed directly to a strong oxidizing acid solution where the butadiene portion of the ABS resin is attacked, and then on to a conventional electroless plating operation.

Preferably, however, careful precautions to assure complete cleansing are preferred to assure optimum bond strengths. Generally, the articles to be treated for electroless plating are optionally washed in an alkaline cleanser to remove any grease or oil on the surface of the articles. Residence time is short, generally only from about 1 to 2 minutes. This step, however, may be eliminated when the ABS resin articles are obtained grease free.

As indicated, the organic pre-etch solution is preferably maintained at a temperature of from 90° F. up to the softening point of the ABS resin and residence time in the pre-etch solution is generally short, ranging from about ½ to about 3 minutes, preferably about 1 minute. Longer residence times may be employed but no particular advantage appears to be gained.

Although the conditioned article may now be rinsed with water and passed directly to the strong oxidizing acid etching, it is preferred to immerse the article for a short period of time, generally from about 30 to about 120 seconds in a 1 to 5 normal acid or basic solution to hydrolyze any etchant remaining on the surface. Any acid or base, with the exception of acetic acid, may be used. This solution is normally maintained at room temperature and serves to quench the etch and thereby prevent contamination of the strong oxidizing acid with hydrolysis products.

After quenching, the article is generally rinsed in water, preferably de-ionized water, and passed on to a strong oxidizing acid etch. While any of the known oxidizing acid solutions for the butadiene portion of the ABS resin may be employed, it is preferred to use a pure chromic acid etch. The chromic acid etch used contains from about 8.5 to about 10.5 lbs. of chromic acid per gallon of solution, which is above the normal solubility of chromic acid in water. Higher solubility is achieved by the presence of trivalent chromium formed in the reduction of the hexavalent chromium during oxidation of the ABS resin surface. An initial solution of high chromic acid content may be conveniently obtained by the addition of oxalic acid to a chromic acid solution to form trivalent chromium ions followed by the addition of chromium trioxide to the resultant solution to form an oxidizing acid of the desired hexavalent chromium assay. The etch with the strong oxidizing acid is generally at a temperature from about 110° F. to distortion temperature of the ABS resin, preferably from about 110° to about 160° F., and more preferably from about 140° to about 150° F. Residence times ranging from about 5 to about 10 minutes, depending upon the nature of the ABS resin treated, are generally employed.

After etching with the strong oxidizing acid, the ABS resin is then passed on to a spray rinse where any of the remaining acid is forcibly washed from the surface of the article.

Following this there may be one or more rinses in water and then a final cleansing with a mild alkaline cleanser, generally maintained at temperatures from about 110° to about 130° F. and the residence time of the article is from about 3 to about 5 minutes.

After final cleansing, the article may now be passed on to any of the electroless plating operations, employing either copper or nickel. Conveniently, the conditioned ABS article may be immersed in a solution of stannous chloride-hydrochloric acid to sensitize the plastic surface by adsorption of stannous ions. This is generally followed by immersion in a solution of a noble metal salt, e.g., palladium chloride, to activate the ABS article by reaction resulting in the reduction of the noble metal ions to the metal. The noble metal film on the ABS article then acts as a catalyst in the electroless metal bath into which the activated ABS article is passed.

A variety of electroless copper and nickel formulations may be used. For example, electroless copper formulations essentially consist of a soluble cupric salt, such as copper sulfate; a complexing agent for the cupric ion, such as Rochelle salt; an alkali hydroxide for adjustment of pH; a carbonate radical as a buffer; and a reducing agent for the cupric ion, such as formaldehyde. The mechanism by which objects having catalyzed surfaces, for example, an ABS article having catalytic palladium metal in its surface, as previously discussed, is plated auto-catalytically in such solutions, has been explained in the literature, for example, Pat. No. 2,874,072, issued Feb. 17, 1959.

Following electroless plating the ABS article may be electrolytically plated by conventional means with copper, nickel, gold, silver, chromium and the like to provide the desired finish on the article. In such operations ultimate adhesive strength is dependent, in part, on metal to metal bond strength. It has been observed that aging the electroless plated ABS article for periods as long as 24 hours or more has a beneficial effect on metal to plastic bond strength. We have observed, however, that this is offset in part by a tendency of the surface to oxidize and for absorbed salts to migrate to the surface of the article and dry. These phenomena have a deleterious effect on appearance and metal to metal bond strength. We have found that immersion of the electrolessly plated ABS article in an aqueous solution containing an anionic or non-ionic surface active agent in an amount of from about 0.5 to about 2.0% by volume provides a thin film of protective coating on the surface of the article during aging. Any water soluble anionic or non-ionic surface active agent, such as, for instance, ethylene oxide condensates containing at least about 8 ethylene oxide groups; phosphate, sulfate and sulfonate modified ethylene oxides; alkylaryl sulfates; dimethyl octane diol; oxyethylated sodium salts; amine polyglycol condensates; modified linear alcohol ethoxylates; alkylphenol ethoxysulfates; sodium heptadecylsulfates and the like, as well as mixtures thereof may be used. Generally, contact with the aqueous surfactant solution follows about a 4 to 5 minute immersion in tap water and a de-ionized water rinse providing the thin film prevents corrosion and drying out of absorbed salts. After aging for the desired period of time, usually 15 minutes or more using forced warm air to 4 hours of more of ambient temperatures, the protective coating is removed by contact with an alkaline cleanser and a brief rinse in sulfuric acid. When the coating has been removed, the electrolessly plated article is then electrolytically plated.

Although many of the steps may be conveniently eliminated and the conditioned article passed after a water rinse directly to the oxidizing acid and thereafter directly to the electroless plating step, it has been observed that exercising care in thoroughly cleansing the article after each conditioning step has a cumulative beneficial effect on bond strength.

When used in accordance with the practice of this invention, the etchant will only cause a satinizing of the ABS resin substrate and ABS articles so treated will be uniform in appearance. The deposited metal coating will be uniform and the bond strength of both electroless deposited copper and nickel to the surface will be unusually high independent of the electroless deposition technique employed. Moreover, high bond strengths, often above 30 lbs./inch, are achieved without undermining or adversely affecting the resin integrity. This is indicated by the result of standard destruct peel tests in which it has been determined that failure is mainly at the resin-metal interface and there is little or no removal of plastic from the ABS substrate with the metal. This bond strength is improved without undermining the structural integrity of the ABS resin.

While no wise limiting, the following are illustrative examples of the practice of this invention. In all instances where comparisons were made, the ABS resin articles were molded from identical resins under identical conditions to eliminate the known parameters associated with resin differences and the method of article preparation. Peel strengths were determined by pulling a one-inch wide strip of metal from the plastic at an angle of 90° using a Dillon pull test apparatus.

EXAMPLE 1

ABS resin parts were immersed in a 20% solution of Carbitol™ acetate maintained at a temperature of 130° F. The parts were immersed in the solution for 1 minute, rinsed, then contacted with a strong chromic acid solution. Following this, the surface of the plastic was made catalytic to an electroless copper by immersion in a solution containing stannous chloride and palladium chloride. The parts where then immersed in an auto-catalytic electroless copper solution containing a chelating agent for the metallic ion, a pH regulator and a reducing agent for the metallic ion. After a thin metallic coating appeared on the plastic part, it was subsequently electroplated with copper to a thickness of 4 mils. The average adhesion value obtained was 22 lbs./inch. Identical parts which were not immersed in the Carbitol™ acetate solution but otherwise treated in an identical manner had an average peel strength of 12 lbs./inch.

EXAMPLE 2

The procedure followed in Example 1, except there was used as the organic pre-etch a 16% solution of Cellosolve™ acetate maintained at a temperature of 120° F. After immersion for 1 minute and processed in the manner set forth above, adhesion values of 26 lbs./inch were obtained.

What is claimed is:

1. In a process for the electroless plating of an acrylonitrile-butadiene-styrene resin with a metal, which includes the step of contacting the resin surface with a strong oxidizing acid to promote adhesion of the electroless deposited metal; the improvement which comprises contacting the acrylonitrile-butadiene-styrene resin surface with a solution of an etchant selected from the group consisting of (1) at least one compound of the formula $$H_3C-\overset{\overset{\large O}{\|}}{C}-OR-OR'$$

wherein R is an aliphatic radical containing from 1 to 4 carbon atoms and R' is selected from the group consisting of hydrogen, methyl, ethyl and (2) methyl acetoacetate, $C_2H_4-O-C_2H_5$, in a media substantially inert with respect to the acrylonitrile-butadiene-styrene resin for a time sufficient to de-glaze and satinize the resin surface prior to contact with the strong oxidizing acid.

2. A process as claimed in claim 1 in combination with the additional step of hydrolyzing the etchant remaining on the resin surface after de-glazing and satinizing and before contact with the strong oxidizing acid.

3. A process as claimed in claim 1 in which the inert media is an aqueous media.

4. A process as claimed in claim 1 in which the etchant is selected from the group consisting of glycol monoacetate; propylene glycol acetate; 2-methoxyethanol, acetate; 2-ethoxyethanol, acetate and 2 - (2-ethoxyethoxy) ethanol, acetate.

5. A process as claimed in claim 4 in which a buffering agent is present in the etchant solution.

6. A process as claimed in claim 5 in which the buffering agent is sodium acetate.

7. A process as claimed in claim 1 in which the etchant solution is maintained at a temperature of from about 90° F. to about 130° F.

8. A process as claimed in claim 7 in which the contact time in the etchant solution is from about 0.5 to about 3 minutes.

9. A process as claimed in claim 1 in which the contact time in the etchant solution is from about 0.5 to about 3 minutes.

10. A process as claimed in claim 1 in which the strong oxidizing acid is an aqueous solution containing chromic acid and trivalent chromium ions.

11. A process as claimed in claim 10 in which the chromic acid concentration is from about 8.5 to about 10.5 pounds per gallon of solution.

12. A solution for deglazing and satinizing the surface of acrylonitrile-butadiene-styrene resins prior to contacting the surface with an oxidizing acid to condition the surface for electroless plating which comprises a solution of an etchant which is selected from the group consisting of (1) at least one compound of the formula $$H_3C-\overset{\overset{\large O}{\|}}{C}-OR-OR$$

wherein R is an aliphatic radical containing from 1 to 4 carbon atoms and R' is selected from the group consisting of hydrogen, methyl, ethyl and $C_2H_4$—O—$C_2H_5$, and (2) methyl acetoacetate, and a minor amount of a buffering agent in a media substantially inert with respect to the acrylonitrile-butadiene-styrene resin.

13. A solution as claimed in claim 12 in which the inert media is an aqueous media.

14. A solution as claimed in claim 13 in which the etchant is within 4 percent by volume of solution saturation.

15. A solution as claimed in claim 12 in which the etchant is selected from the group consisting of glycol monoacetate; propylene glycol acetate; 2-methoxyethanol, acetate; 2-ethoxyethanol, acetate and 2-(2-ethoxyethoxy) ethanol, acetate.

16. A solution as claimed in claim 12 in which the etchant is selected from the group consisting of glycol monoacetate; propylene glycol acetate; 2-methoxyethanol, acetate; 2-ethoxyethanol, acetate and 2-(2-ethoxyethoxy) ethanol, acetate.

17. A solution as claimed in claim 12 in which the buffering agent is sodium acetate.

18. A solution as claimed in claim 12 in which a nonionic surface active agent is present.

19. A solution as claimed in claim 12 in which the etchant is within 4 percent by volume of solution saturation.

20. A solution as claimed in claim 12 in which the etchant is present in solution in an amount up to 40 percent by volume.

21. A process as claimed in claim 1 in combination with the additional steps of:

(a) contacting the deglazed and satinized acrylonitrile-butadiene-styrene resin surface with a strong oxidizing acid;
(b) catalyzing said resin surface after contact with the strong oxidizing acid with a noble metal salt;
(c) electrolessly plating the catalyzed resin surface;
(d) immersing the electrolessly plated surface in an aqueous solution containing a surface active agent selected from the group consisting of anionic and nonionic surface active agents in the amount of from about 0.5 to about 2% by volume to provide a protective thin film coating thereon; and
(e) aging the coated surface before subjecting the electrolessly plated surface to electrolytic plating.

References Cited

UNITED STATES PATENTS

| | | | |
|---|---|---|---|
| 1,769,577 | 7/1930 | Hopkins | 117—6 |
| 3,445,350 | 5/1969 | Klinger et al. | 204—30 |

OTHER REFERENCES

Plastic Products, June 1934, X, 6, p. 227.
Plastic Products, July 1934, XI, 1, p. 25.

ALFRED L. LEAVITT, Primary Examiner
J. A. BELL, Assistant Examiner

U.S. Cl. X.R.

117—6, 160; 106—311; 156—2; 204—30

PO-1050
(5/69)

UNITED STATES PATENT OFFICE
CERTIFICATE OF CORRECTION

Patent No. 3,671,289 Dated June 20, 1972

Inventor(s) Eileen Maguire and Leon A. Kadison

It is certified that error appears in the above-identified patent and that said Letters Patent are hereby corrected as shown below:

Col. 2, line 23, "amploying" should read --employing--.
Col. 6, line 75, the formula shown terminal "R" should read --R'--.

Signed and sealed this 15th day of May 1973.

(SEAL)
Attest:

EDWARD M.FLETCHER,JR.
Attesting Officer

ROBERT GOTTSCHALK
Commissioner of Patents